(12) United States Patent
Young

(10) Patent No.: US 7,657,461 B2
(45) Date of Patent: *Feb. 2, 2010

(54) SYSTEMS FOR SELECTING A GROUP OF BIDDERS FOR A CURRENT BIDDING EVENT USING PRIORITIZATION

(75) Inventor: Erik P. Young, Pittsburgh, PA (US)

(73) Assignee: Ariba, Inc., Sunnyvale, CA (US)

( * ) Notice: Subject to any disclaimer, the term of this patent is extended or adjusted under 35 U.S.C. 154(b) by 45 days.

This patent is subject to a terminal disclaimer.

(21) Appl. No.: 12/150,896

(22) Filed: Apr. 30, 2008

(65) Prior Publication Data

US 2008/0208616 A1    Aug. 28, 2008

Related U.S. Application Data

(60) Continuation of application No. 11/582,932, filed on Oct. 17, 2006, now Pat. No. 7,401,035, which is a division of application No. 10/052,064, filed on Jan. 17, 2002, now Pat. No. 7,146,331.

(51) Int. Cl.
G06Q 30/00 (2006.01)
G06Q 40/00 (2006.01)

(52) U.S. Cl. .......................................... 705/26; 705/37

(58) Field of Classification Search .................... 705/26, 705/27, 37
See application file for complete search history.

(56) References Cited

U.S. PATENT DOCUMENTS

2001/0027431 A1* 10/2001 Rupp et al. .................... 705/37
2001/0029480 A1* 10/2001 Ishikawa et al. ............... 705/37
2002/0002526 A1* 1/2002 Kotas ............................ 705/37
2002/0099643 A1* 7/2002 Abeshouse et al. ............ 705/37
2003/0014326 A1* 1/2003 Ben-Meir et al. .............. 705/26

OTHER PUBLICATIONS

Business editors, "Perfect and Open Ratings Form Alliant to Provide Critical Supplier Performance Ratings to Private Exchanges and Net Markets," Business Wire, New York, Oct. 30, 2000, p. 1.*

* cited by examiner

Primary Examiner—Amee A Shah
(74) Attorney, Agent, or Firm—Van Pelt, Yi & James LLP

(57) ABSTRACT

A method and system for selecting potential bidders or suppliers for a current electronic auction by using quantitative models to create a prioritized list of potential suppliers. A prioritization software analyzes a supplier's bidding participation history and bidding competitiveness history from the bidding data collected for all prior auctions in which the supplier participated or was requested by the auction coordinator to participate. Using the prior bid data, the software generates a participation score and a competitiveness score for the supplier. The participation and competitiveness scores may be combined to generate a combined score. All potential suppliers may be prioritized based on any of these scores individually or a combination of two or more of these scores. The prioritization list generated using quantitative values instead of subjective values minimizes the amount of unnecessary calls to potential suppliers and maximizes the likelihood that a called supplier will place a competitive bid in the current auction, thereby increasing the bidding yield per supplier selected.

15 Claims, 7 Drawing Sheets

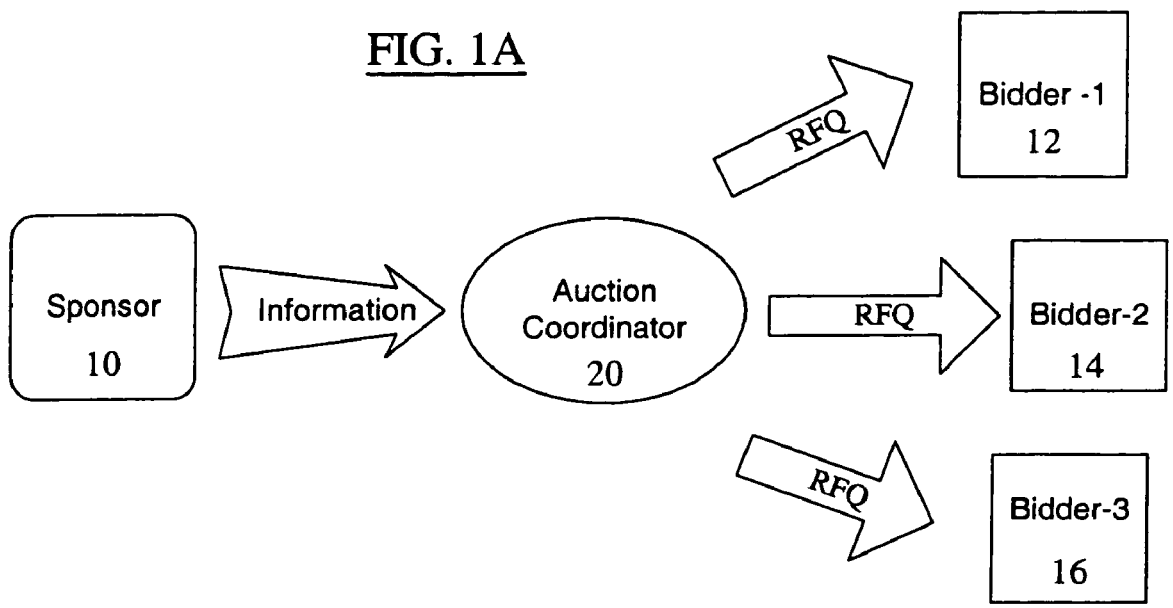
FIG. 1A
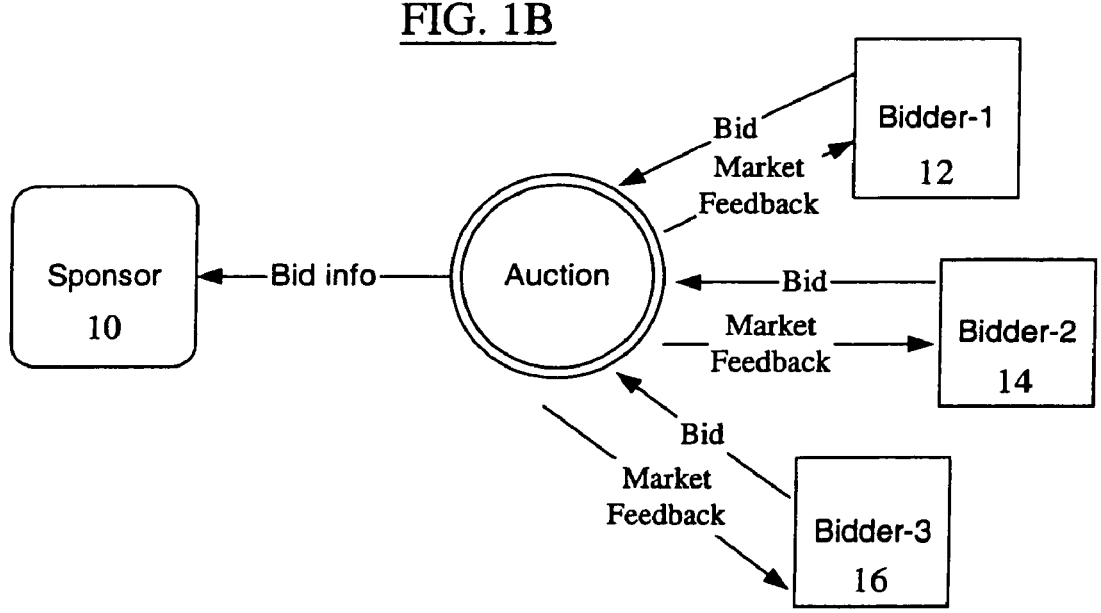
FIG. 1B
FIG. 1C
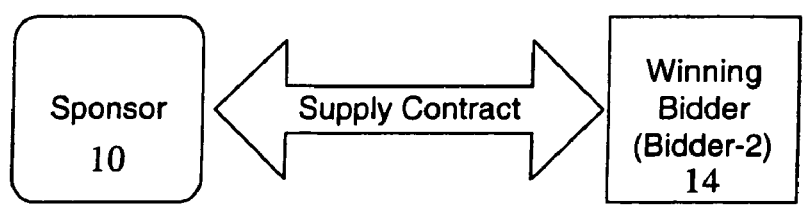

FIG. 5

SYSTEMS FOR SELECTING A GROUP OF BIDDERS FOR A CURRENT BIDDING EVENT USING PRIORITIZATION

This is a Continuation of application Ser. No. 11/582,932, filed Oct. 17, 2006, now U.S. Pat. No. 7,401,035 which is a Divisional of U.S. application Ser. No. 10/052,064, filed Jan. 17, 2002, now U.S. Pat. No. 7,146,331 which are hereby incorporated by reference.

BACKGROUND

1. Field of the Invention

The present invention generally relates to conducting online electronic auctions, and, more particularly, to a method and system for selecting potential bidders or suppliers for an electronic auction by using quantitative models to create a prioritized list of potential suppliers.

2. Description of Related Art

Procurement of goods and services have traditionally involved high transaction costs. The cost of finding and qualifying potential bidders has been particularly high. The advent of electronic commerce has introduced new methods of procurement that lower some of the transaction costs associated with procurement. Electronic procurement, in particular business-to-business electronic procurement, matches buyers and suppliers and facilitates transactions that take place on networked processors.

Four models of electronic procurement have been developed: catalog, buyer-bidding auctions, seller-bidding auctions, and exchange marketplaces.

The "catalog" model was an early form of online electronic procurement. Initially, electronic catalogs were developed primarily by sellers, typically suppliers, to help customers obtain information about products, and order supplies electronically. Those first electronic catalogs were single-source; i.e. they only allowed customers to obtain information and products from a specific supplier.

Although the first electronic catalogs reduced the information search cost associated with procurement, customers were disadvantageously "locked in" to one supplier at each electronic catalog. Customers were thus unable to compare a number of competing products in a single catalog. Therefore, certain suppliers with single-source catalogs began including competitors' products in their systems. The inclusion of competing products in electronic catalogs reduced procurement information search costs even further. By offering competing products, electronic catalogs became "electronic markets."

Many electronic catalogs, however, were biased toward the supplier offering the electronic catalog, and it was thought that procurement costs could be lowered further through an unbiased market. Therefore, third-party "market makers" have developed markets for many standard products and services, which were intended to be unbiased markets. For example, Inventory Locator Services has compiled a database that lists all airplane parts suppliers that have a certain item in stock. Buyers dial into the database to get information on the parts they need. Here, it is a third party, Inventory Locator Service, not a supplier, that is creating the unbiased electronic market.

Electronic commerce using the electronic catalog model typically involves one buyer and one seller at a time. When many buyers compete for the right to buy from one seller, a buyer-bidding auction model, or forward auction, is created. Catalog and buyer-bidding auction models, however, have limitations and do not work well in every situation. For example, it is difficult for a supplier to publish set prices in a catalog for custom products. Therefore, when a buyer requires a custom product, pricing for that product typically will not be found in a catalog. Likewise, it is difficult to specify a custom product and identify buyers who might use that custom product for a buyer-bidding auction. Additionally, there may be only one buyer interested in a custom product, such that a buyer-bidding auction may not be applicable in all cases. Thus, few suppliers can typically provide custom goods and services and standard product and pricing information is typically not available for buyers of custom industrial products.

Referring again to the cost of traditional procurement, and particularly procurement of custom products and services, when a company requires a custom product, a buyer/purchaser for the company would typically procure the product by searching for potential suppliers and then acquiring price quotes from the potential suppliers for the needed custom product. The search tends to be slow and random, and typically relies heavily on personal relationships. The costs associated with locating vendors, comparing prices, and negotiating a deal are therefore large.

As a solution to reduce the cost associated with procurement of custom products and services, supplier-bidding auctions for products and services defined by a buyer have been developed. The assignee of the present application has developed a system in which sellers downwardly bid against one another to achieve the lowest market price in a supplier-bidding auction. The auction marketplace is one-sided, i.e., one buyer and many potential suppliers or sellers, although multiple-buyer auctions are possible. Typically, the products being purchased are components or materials; however, services may also be purchased through auction. "Components" may typically include fabricated tangible pieces or parts that become part of assemblies of durable products. Example components include gears, bearings, appliance shelves, door handles, etc. "Materials" may typically include bulk quantities of raw materials that are further transformed into products. Example materials include corn syrup or sheet metal.

Even in a supplier-bidding auction, the search for potential suppliers may still remain slow and random and the possibility of obtaining price quotes from the potential suppliers with some degree of certainty remains illusive because of the subjective nature of supplier selection. The subjective evaluation factors may include, for example, the buyer's personal impression about the potential supplier, the frequency of prior auction participation by that supplier, etc. Because of such subjective evaluation, many potentially promising suppliers may get overlooked and not contacted by the buyer. It is therefore desirable to reduce the transaction cost involved in supplier selection by devising a scheme wherein potential suppliers are selected objectively and the number of suppliers required at the beginning of a competitive bidding event is dramatically reduced. In other words, it is desirable that suppliers who do not appear objectively promising for a bidding event may not get invited to participate in the auction. It is further desirable to minimize the amount of unnecessary calls to potential suppliers and to maximize the likelihood that a called supplier will place a competitive bid, thereby increasing the bidding yield per supplier selected.

SUMMARY

In one embodiment, the present invention contemplates a method for selecting a group of potential bidders or suppliers for a current bidding event to auction a lot having one or more items. The method first identifies a prior bidding event where one or more items substantially similar to at least one of the items in the lot were auctioned. The prior bidding event may include a number of contact events (e.g., a "bid-in" event, a "sent RFQ (Request for Quote)" event, a "Fact Sheet" event, etc.) for each bidder participating in that prior bidding event. The method further identifies one or more participating bidders for that prior bidding event and quantifies participation of each identified bidder in each of the plurality of contact events for the prior bidding event, thereby generating a corresponding participation score for each identified bidder. All identified bidders are then prioritized in a first descending order based on their respective participation scores, thereby generating a first prioritized list of bidders. The method then selects the group of potential bidders for the current bidding event from the first prioritized list of bidders.

In another embodiment, the present invention further contemplates a method for selecting a group of potential suppliers which identifies each bid-in event for the prior bidding event and obtains a corresponding rank for each identified bidder for each bid-in event in which that identified bidder has participated. The method then quantifies each corresponding rank for each identified bidder for each bid-in event in which that identified bidder has participated, thereby generating a corresponding competitiveness score for each identified bidder. All identified bidders are then prioritized in a second descending order based on their respective competitiveness scores, thereby generating a second prioritized list of bidders. The method may select the group of potential bidders for the current bidding event from the second prioritized list of bidders.

In a still further embodiment, the present invention contemplates a method for selecting a group of potential suppliers which generates a corresponding combined score for each identified bidder using that bidder's participation and competitiveness scores. The method then prioritizes all identified bidders in a third descending order based on their respective combined scores, thereby generating a third prioritized list of bidders. The method may select the group of potential bidders for the current bidding event from the third prioritized list of bidders.

The supplier prioritization may be accomplished using prioritization software according to the present invention. The software analyzes a supplier's bidding participation history and bidding competitiveness history using the prior bid data and generates a participation score and a competitiveness score for the supplier. The participation and competitiveness scores may be combined to generate a combined score. The software may generate one or more prioritized lists that may contain the names of suppliers in a descending order so that the auction coordinator may select which of the listed suppliers be requested to participate in the current auction.

The supplier prioritization software according to the present invention dramatically reduces the number of suppliers required at the beginning of a competitive bidding event or auction. Thus, the prioritization software assists in reducing the transaction cost involved in supplier selection by generating, using objective data, a prioritized list of potential suppliers that may be invited to participate in the auction. The prioritization list generated using quantitative values (instead of subjective values) further minimizes the amount of unnecessary calls to potential suppliers and maximizes the likelihood that a called supplier will place a competitive bid, thereby increasing the bidding yield per supplier selected.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention. In the drawings:

FIG. 1A is a schematic illustration of the entities involved in an embodiment of an auction wherein the sponsor identifies goods or services to be purchased in a request for quotation;

FIG. 1B is a schematic illustration of entities participating in an embodiment of an auction;

FIG. 1C is a schematic illustration of entities participating in an embodiment of a contract award following an auction;

FIG. 5 illustrates an exemplary user interface generated and displayed by the prioritization module according to one embodiment of the present invention;

DETAILED DESCRIPTION

Figure 2:
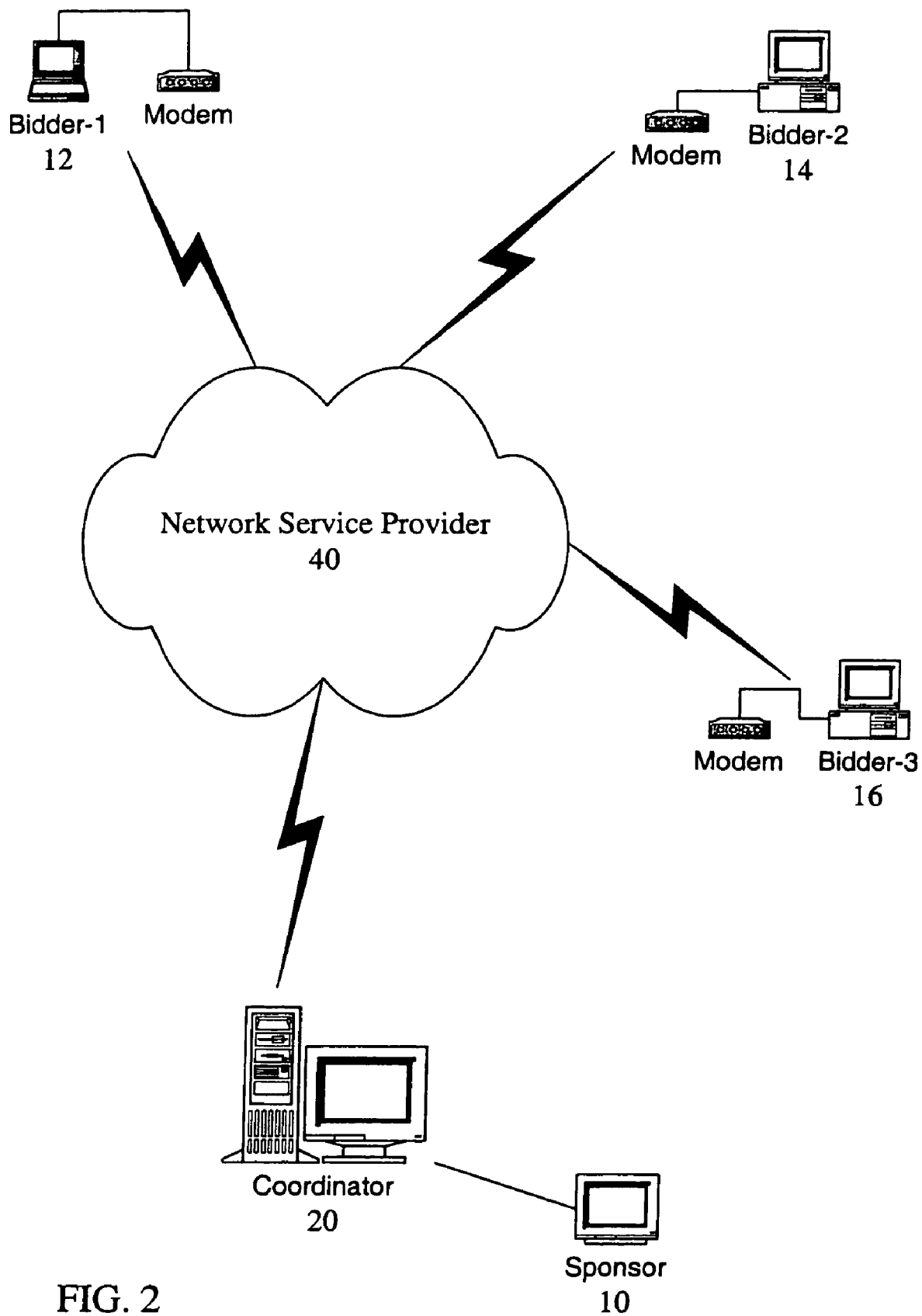
FIG. 2 is a schematic illustration of communications links between the coordinator, the buyer, and the suppliers in an embodiment of an auction.

Reference will now be made in detail to the preferred embodiments of the present invention, examples of which are illustrated in the accompanying drawings. It is to be understood that the figures and descriptions of the present invention included herein illustrate and describe elements that are of particular relevance to the present invention, while eliminating, for purposes of clarity, other elements found in typical auction systems and computer networks.

In a supplier-bidding auction or reverse auction, bids, which are often in the form of a price quote, typically start high and move downward over time as bidders interact to establish a closing price. It is noted that the terms "supplier" and "bidder" are used interchangeably herein to refer to a person or legal entity participating as a bidder in, for example, an on-line auction. Similarly, the terms "sponsor", "buyer", "purchaser" or "auction requester" are also used interchangeably herein to refer to a person or legal entity that puts up a lot (as defined hereinbelow) for auction and requests bids for the same from the suppliers or bidders. It is further noted that the terms "products," "goods," "materials," and "services" are used to refer to (based on the context of the discussion) the items to be auctioned.

The basic process for a purchaser sponsored supplier-bidding or reverse auction, as conducted by the assignee of the present invention, is described below with reference to FIGS. 1A-1C, which illustrate the functional elements and entities involved in setting up and conducting a typical supplier-bidding auction. FIG. 1A illustrates the creation of an auctioning event or a competitive bidding event (CBE), FIG. 1B illustrates the bidding during an auction, and FIG. 1C illustrates results after completion of a successful auction. It is noted that FIGS. 1A-1C are for illustrative purpose only. In other words, even though only three bidders 12, 14, and 16 are shown in the auction process depicted in FIGS. 1A-1C, it is obvious that in an actual auction there may be more or less than three bidders participating in the auction depending on, for example, the products or services to be auctioned, the qualifications demanded of a bidder, how commercially lucrative the auction is, the reputation of the sponsor 10, etc.

Industrial buyers do not typically purchase one component at a time. Rather, they tend to purchase whole families of similar components. Therefore, in a typical industrial supplier-bidding auction, products are grouped together in "lots" of related items for bidding. In a regular lot bidding auction, each lot is composed of one or more "line items." In the regular lot bidding auction, the suppliers bid on each line item and the bidder having the best bid for all of the parts in the lot is the best bidder. The best bidder (e.g., the bidder 14 in FIG. 1C) is typically awarded a contract to supply the items in the lot. By lotting products, potential suppliers can bid on lots for which they are best suited, and are not typically required to bid on every lot. Such a division into lots beneficially reduces the barrier to entry for new potential suppliers that only have capability to supply some of the needed products (or services) in the auction. Reducing the barrier to entry also benefits the purchaser by injecting additional bidders into bidding for certain lots.

Typically, components in a lot are related to one another such that it is more efficient to have a supplier provide all of the components in that lot. As an example, a buyer might purchase a given plastic knob in two different colors, or might purchase a nameplate in four different languages. Those parts are so similar that it is nearly always more efficient to purchase those related components from the same supplier because, for example, all of the knobs may be made using the same mold. Thus, such related items are typically grouped in a single "lot." As is known by one skilled in the art, there are many additional methods of lotting products for an auction.

As will be apparent to one skilled in the art, while the invention is generally described in terms of one buyer and multiple suppliers, the present invention may also be used in other types of electronic markets, such as auctions having multiple potential buyers and sellers, forward auctions having a single seller and multiple potential purchasers, upward-bidding auctions, or electronic exchange marketplaces. As noted hereinbefore, the term "sponsor" is utilized herein to identify the party or parties that originate the auction. In a forward auction, for example, the sponsor would typically be the supplier or seller of one or more goods or services. In such a forward auction, that sponsor might state a good that it desires to sell and receive bids from parties wishing to purchase that good. Those parties wishing to purchase that good would therefore be "bidders" 12-16 in such a forward auction.

In a reverse auction example, the sponsor would typically be the purchaser or buyer of one or more goods or services. In such a reverse auction, that supplier might state a good that it desires to purchase and receive bids from parties wishing to supply that good. Those parties wishing to supply that good would furthermore be "bidders" 12-16 in such a reverse auction.

In the typical supplier-bidding reverse auction model, the product or service to be purchased is usually defined by the sponsor of the auction. As shown in the embodiment illustrated in FIG. 1A, when the sponsor 10 decides to use the auctioning system of the present invention to procure products or services, the sponsor 10 provides information to an auction coordinator 20. That information may include information about incumbent suppliers and historic prices paid for the products or services to be auctioned, for example. Typically, the sponsor 10 may also work with the auction coordinator 20 to define the products and services to be purchased in the auction and, if desired, lot the products and services appropriately so that needed products and services can be procured using optimal auction dynamics. A specification may then be prepared for each desired product or service, and a Request for Quotation ("RFQ") generated for the auction.

Next, the auction coordinator 20 typically identifies potential suppliers 12-16 (as discussed in more detail hereinbelow), preferably with input from the sponsor 10, and invites the potential suppliers or bidders 12-16 to participate in the upcoming auction. The suppliers 12-16 that are selected to participate in the auction may be given access to the RFQ, typically through an RFQ in a tangible form, such as on paper or in an electronic format.

As shown in FIG. 1B, during a typical auction, bids are made for lots. Bidders 12-16 may submit actual unit prices for each line item within a lot. However, the competition in an auction is typically based on the aggregate or total value bid for all line items within a lot. The aggregate value bid for a lot may, therefore, depend on the level and mix of line item bids and the quantity of goods or services that are offered for each line item. Thus, bidders submitting bids at the line item level may actually be competing on the lot level. During the auction, the sponsor 10 can typically monitor the bidding as it occurs. Bidders 12-16 may also be given market feedback during the auction so that they may bid competitively.

Feedback about bidding activity is referred to as "market feedback" and includes any information or data related to the bidders 12-16 or their bids, interrelationships between those bids, and any other bid related information or data that is received before or during the auction. Market feedback may include, for example, bids that have been placed by other bidders 12-16, the rank of a bidder in relation to one or more other bidders 12-16, the identity of bidders 12-16, or any subset of that information. Market feedback may also include non-pricing information such as, for example, the quality of the goods to be provided by bidders 12-16 and shipping costs associated with one or more bidders 12-16. Providing such market feedback to bidders 12-16 in an auction helps create real-time competitive interaction among participants in the auction because, without feedback, bidders 12-16 who are not leading in an auction might not be aware of their relative position and would have less incentive to revise their price quotes and place additional bids to remain competitive.

After the auction, the auction coordinator 20 may analyze the auction results with the sponsor 10. The sponsor 10 typically conducts final qualification of the low bidding supplier or suppliers. The sponsor 10 may furthermore retain the right not to award business to a low bidding supplier (e.g., the supplier 14 in FIG. 1C) based on final qualification or other business concerns. As shown in FIG. 1C, at least one supply contract is usually drawn up and executed based on the results of the auction.

The auction may be conducted electronically between bidders 12-16 at their respective remote sites and the auction coordinator 20 at its site. In an alternative embodiment, instead of the auction coordinator 20 managing the auction from its site, the sponsor 10 may itself perform the auction coordinator tasks from the sponsor's site.

Information may be conveyed between the coordinator 20 and the bidders 12-16 via any known communications medium. As shown in FIG. 2, bidders 12-16 may participate in the auction through the Internet via a network service provider 40 accessed, for example, through a dial-up telephone connection. Alternately, sponsors 10 and bidders 12-16 may be coupled to the auction by communicating directly with the coordinator 20 through a public switched telephone network, a wireless network (including, for example, a cellular telephone network), or any other known connection method. Other methods of connecting sponsors 10 and bidders 12-16 and other communications media are known to those skilled in the art, and are intended to be included within the scope of the present invention. For example, the sponsor computer terminal 10 may be connected to the auction coordinator's computer terminal 20 via a LAN (local area network), WAN (wide area network) or any other suitable data communication network.

It is noted that the same reference numeral is used herein to refer to a person or entity and its computer terminal for ease of discussion. For example, the reference numeral "20" is used in FIG. 2 to refer to the auction coordinator and also to refer to the computer terminal accessible to or operated by the same auction coordinator, depending on the context of reference. Similarly, the reference numeral "12" refers to the bidder-1 in FIG. 2 and also to the computer terminal accessible to or operated by bidder-1. Furthermore, it is noted that although one computer terminal 20 is illustrated at the auction coordinator's site, there may be more than one computer terminal located at that site and linked to one another via, for example, an ethernet LAN. Each computer at the auction coordinator's site may be configured to store a specific type of information (e.g., the supplier bidding history, the supplier capability profile information, etc., discussed hereinbelow with reference to FIG. 3) related to the auction event.

A computer software application ("the auction communication software") may be used to manage the auction. The auction communication software may include two components: a client component and a server component. Each client component may reside on a bidder's computer terminal 12-16 and the server component may reside on the "host" computer terminal 20. The client and server components may facilitate data communication between bidders' computers 12, 14, 16 and the host computer 20. The communication between a client component and the server component achieves auction-related transaction processing including, for example, customer-validation (e.g., user-ID and passwords), receipt of bidder profile, bid data collection, delivery of notifications and information about winning bids, etc. Each bidder computer terminal 12-16 and the auction host computer 20 may be capable of processing various data and generating appropriate information displays for the human operators at respective computer terminals. As noted hereinbefore, the sponsor 10 may itself act as the auction coordinator 20. In that event, the sponsor's computer terminal 10 may function as the host computer 20 and include the necessary hardware and software.

In one embodiment, during the auction process, various auction-related data (discussed hereinbelow with reference to FIG. 3) may get collected and stored—either at the computer 20 or at one or more other computers (not shown) at the auction coordinator's site. The auction coordinator may store such auction-related data as, for example, information about a supplier's capability to participate in the current auction, information about a supplier's past performance in various prior auctions, etc. A supplier prioritization software module (discussed later with reference to FIG. 3) operates on such auction-related data to generate supplier prioritization information for the current auction as discussed hereinbelow with reference to FIGS. 3-8.

It is to be understood, however, that the present invention may be used in other applications, that the present invention would not necessarily have to be carried out online, and that the present invention may be performed by other than a computer processor. The present invention may also be utilized in connection with auctions other than reverse auctions. For example, the present invention may be advantageously utilized with forward auctions, wherein the party offering the highest priced qualified bid, rather than the lowest priced qualified bid (as, for example, in a reverse auction), is awarded the goods or services being sold. Thus, placing a "better bid" in a reverse auction indicates placing a lower bid, while placing a "better bid" in a forward auction indicates placing a higher bid.

Figure 3:
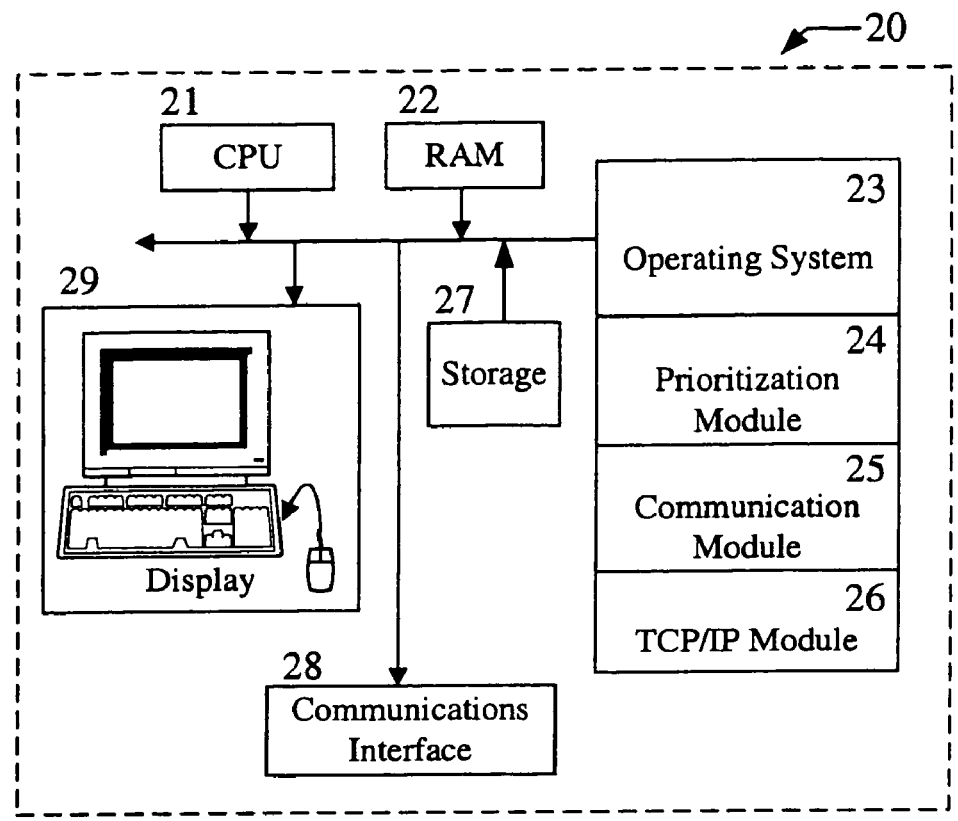
FIG. 3 illustrates various software modules and auction-related data in conjunction with an exemplary auction coordinator computer system.
Figure 3:
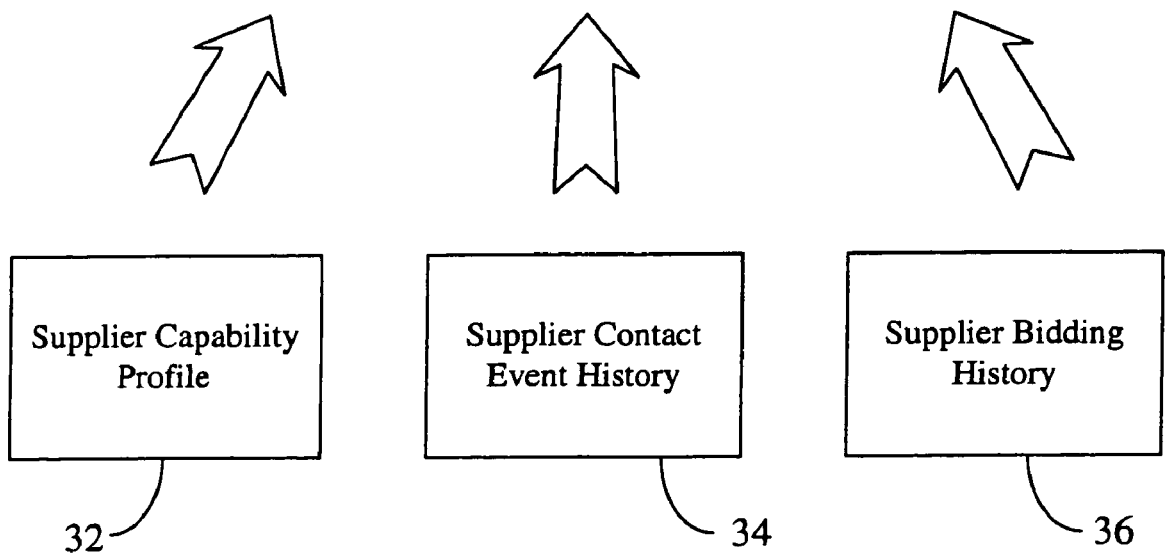

FIG. 3 illustrates various software modules and auction-related data in conjunction with an exemplary auction coordinator computer system 20. The auction coordinator's computer 20 may include an operating system 23, the supplier prioritization module 24 (discussed in detail hereinbelow), the server component of the auction communication software 25, and the server module of the TCP/IP (Transmission Control Protocol/Internet Protocol) software 26. In one embodiment, the auction coordinator's computer terminal 20 is an IBM-PC type computer system operating under the Microsoft Windows® NT operating system environment. Similarly, each bidder's computer terminal 12-16 is also an IBM-PC line of computer system with Windows® 2000 operating system. The Internet protocol software (to carry out the auction over the Internet) for the auction coordinator's computer terminal and for each bidder's computer terminal may include respective server and client versions of the Microsoft Internet Explorer web browser software. Other web browsers, operating systems, or computer architectures may be conveniently employed as well.

The host computer system 20 may further include a processor or central processing unit (CPU) 21, a random access memory (RAM) unit 22 and a data storage unit 27 to facilitate execution of various software modules shown in FIG. 3. Additionally, the host computer 20 also includes input and output devices 29 (such as, for example, a monitor, a printer, a mouse and a keyboard) and a communications interface 28 (including, for example, a modem unit (not shown)) for communicating with the bidder computers 12-16 and also for communicating with other computers at the auction coordinator's site. The data storage device may include, either individually or in combination, for example, a magnetic storage device, a random access memory device (RAM), or a read only memory device (ROM). As noted hereinbefore, the sponsor 10 may itself act as the auction coordinator 20. In that event, the sponsor's computer terminal 10 may function as the host computer 20 and include the hardware and software described hereinabove for the host computer 20.

It is noted that although the prioritization module 24 is shown to reside on the host computer 20, in one embodiment, the prioritization module 24 may be installed on a stand-alone computer (i.e., a computer not connected to any other computer system or network) and various auction-related data 32, 34, 36 (described later hereinbelow) may be supplied to the module 24 to generate the supplier prioritization information in a manner described hereinbelow.

Prior to execution, the auction communication software 25 and/or the prioritization module 24 may be initially stored on an external storage medium (not shown) (e.g., a compact disc (CD), a digital versatile disc (DVD), a magnetic cartridge tape, or any other suitable magnetic or optical storage medium) or on an internal storage medium (e.g., the storage unit 27 in FIG. 3).

The prioritization module (PM) 24 is configured to operate on a variety of data inputs, three of which (32, 34, 36) are shown in FIG. 3. Each data block 32, 34, 36 may reside on a different computer system at the auction coordinator's site. The auction coordinator may transfer or replicate (either manually or electronically) the data from different computer systems to the host system 20 (e.g., in the storage unit 27 in the host system 20) to allow the PM 24 to operate on the data according to the process steps illustrated in FIG. 4. Alternatively, the data in all three data blocks may not get stored in a distributed fashion, but, instead, may get stored on a single computer (e.g., in the storage unit 27 in the host computer 20).

In one embodiment, the data inputs 32, 34, 36 are in a file format that is accessible by Microsoft® Access software. For example, each of the data inputs 32, 34, 36 may be a Microsoft® Access data file. The program code for the prioritization module 24 may be created as a Microsoft® Access database file, which may be executable by the Microsoft® Access software and operate on the data inputs 32, 34, 36. In one embodiment, the host computer 20 may communicate with a backend server computer (not shown) in a client-server environment. The server computer may store various data (either generated during execution of the PM 24 or obtained through other sources) necessary for successful operation of the PM 24. In that embodiment, the PM 24 may execute SQL queries to interact with the server to exchange data between the server and the host system 20. All the computer displays generated by the PM 24 during run time (e.g., the display screen shown in FIG. 5) may be displayed on the host computer 20 using the Microsoft® Access software.

The data blocks 32, 34 and 36 represent auction-related data collected or generated during prior auctions (i.e., auctions that have already occurred or are concluded prior in time to the commencement of the present auction requested by the buyer 10). The auction coordinator may supply these prior-auction data to the PM 24, which operates on the data to generate a prioritized list of suppliers for the current auction (i.e., the auction to be commenced for the buyer 10). Each prior-auction data 32, 34, 36 may be stored in a searchable database residing on a computer (e.g., the host computer 20). Each searchable database may reside on a different computer, or on a single computer (networked or stand-alone) as discussed hereinbefore.

Thus, the PM 24 is employed prior to commencing an auction to generate a list of potential suppliers the auction coordinator may wish to invite to participate in the auction to be carried out on behalf of the buyer 10. Various auction-related information about suppliers, gathered during prior auctions handled by the auction coordinator 20 for different buyers, may be objectively analyzed by the prioritization module 24 to minimize the amount of unnecessary calls to potential suppliers and also to increase the likelihood of a called supplier placing a competitive bid, thereby increasing the bidding yield of the supplier contact process performed prior to commencing an auction to expedite the competitive bidding.

The auction-related data from prior auctions may include pre-auction data and post auction data. The pre-auction data may include, for example, the information about what goods or services a supplier is capable of providing, and the names of suppliers that are permitted to bid. The post auction data may include, for example, the information about a supplier's bidding history, and the information concerning the stages of an auction a supplier has participated in.

Referring again to FIG. 3, the supplier capability profile data ("the profile data") 32 relates to the capabilities of a supplier to provide the buyer-requested goods or services. In one embodiment, for each auction, a supplier may need to get registered with the auction coordinator to be able to participate in that auction. During the supplier registration process, the supplier may be requested to fill out a Supplier Capability Profile form (either online or in a paper form) that collects information from the supplier against a number of data fields provided in the Profile form, thereby obtaining the profile data. Some exemplary data input fields in the Profile form include process capabilities field (i.e., which industrial process or processes the supplier is capable of performing), sales levels field (e.g., annual or monthly sales or revenue), quality certification field (i.e., whether the supplier has QS (Quality Systems) or ISO (International Organization for Standardization) certification), and the supplier's geographic location field. The profile data provided by the supplier against these categories or fields may be stored in a searchable database in a computer (e.g., the host computer 20).

The supplier contact event history data 34 ("the contact event data") may be obtained by monitoring (either electronically or manually) the supplier's participation during each prior auction for which the supplier is registered to place bids. In other words, the contact event data may identify how far the supplier progressed in the bidding process. Each prior auction or competitive bidding event (CBE) may involve a number of contact events including, for example, the candidate event (where a supplier is considered to be a potential candidate or bidder for the auction), the contact event (where the supplier is contacted by the auction coordinator or the auction sponsor and invited to participate in the auction), the fact sheet event (where a supplier submits the profile data), the SQ-in event (what is this?), the "RFQ sent" event (where an RFQ is sent to the supplier), the "supplier agreement in" event (where the supplier enters into a formal agreement with the auction coordinator or auction sponsor and agrees to participate in the auction and to be bound by the terms of the agreement), the "trained" event (where the auction coordinator may train one or more supplier personnel as to how to participate in the auction and may educate them about rules and conditions governing the auction), and the "bid-in" event (where an actual bid is received from the supplier, i.e., the supplier actively participates in the auction).

The supplier bidding history data 36 ("the bidding history") is typically obtained by monitoring a supplier's bids during the bid-in event for an actual auction. As noted hereinbefore, there may be more than one lot on auction during a competitive bidding event, and each lot may contain more than one product or item to be auctioned. However, a supplier may not necessarily bid for every lot on auction. Therefore, the supplier bidding history may focus on, for example: (1) the CBE's a supplier has participated in, (2) the lot(s) in each of those CBE's for which the supplier placed bids, and (3) what was the "rank" of that supplier for each lot the supplier bid on.

The "rank" of the bidders may generally be determined by comparing, in real-time, the lowest amount bid by each bidder and ordering the bidders according to those lowest bids. The bidder who is ranked first is the bidder that has bid an amount lower than any other bidder in a reverse auction. The last rank may be a rank equal to the number of bidders who have submitted bids in the auction. In the case of tie bids between bidders, the last rank may be a rank equal to the number of unique bids by each bidder. In a reverse auction based on price only, the bidder having that last rank is the bidder that has submitted the highest amount.

Of course, there are many known ways to calculate the rank, and any of those may be used in connection with the subject invention, and are intended to be within the scope of the present invention. In a reverse auction, the bidders are generally ranked between first and last according to the amounts of their lowest submitted bids at any given time. Thus, a higher, or better ranked bidder (e.g., the bidder 14 in FIG. 1C) in a reverse auction is a bidder who has placed a comparatively lower bid, while a higher, or better ranked bidder in a forward auction is a bidder who has placed a comparatively higher bid.

An auction may alternately be based on one or more factors other than price, such as quality, delivery factors (e.g., labor rate, lead time), and/or other factors (e.g., contract length) that are referred to herein collectively as "total value." Thus, rank may also be based on factors other than price, including total value and any other factor that is useful in an auction setting. A bid or bid amount is a value that is submitted by each participating bidder (e.g., the bidders 12-16 in FIGS. 1A-1B) for comparison to the bids of other bidders, and may likewise be based on a variety of bid factors that are considered important to the bid participants. Those factors may include, for example, price, quality, other costs such as delivery costs, labor rate, project lead time, contract length, or a total value. Bids may also be placed in a number of ways including, for example, absolute total value, or comparative value such as bidding in relation to an index price.

Figure 4:
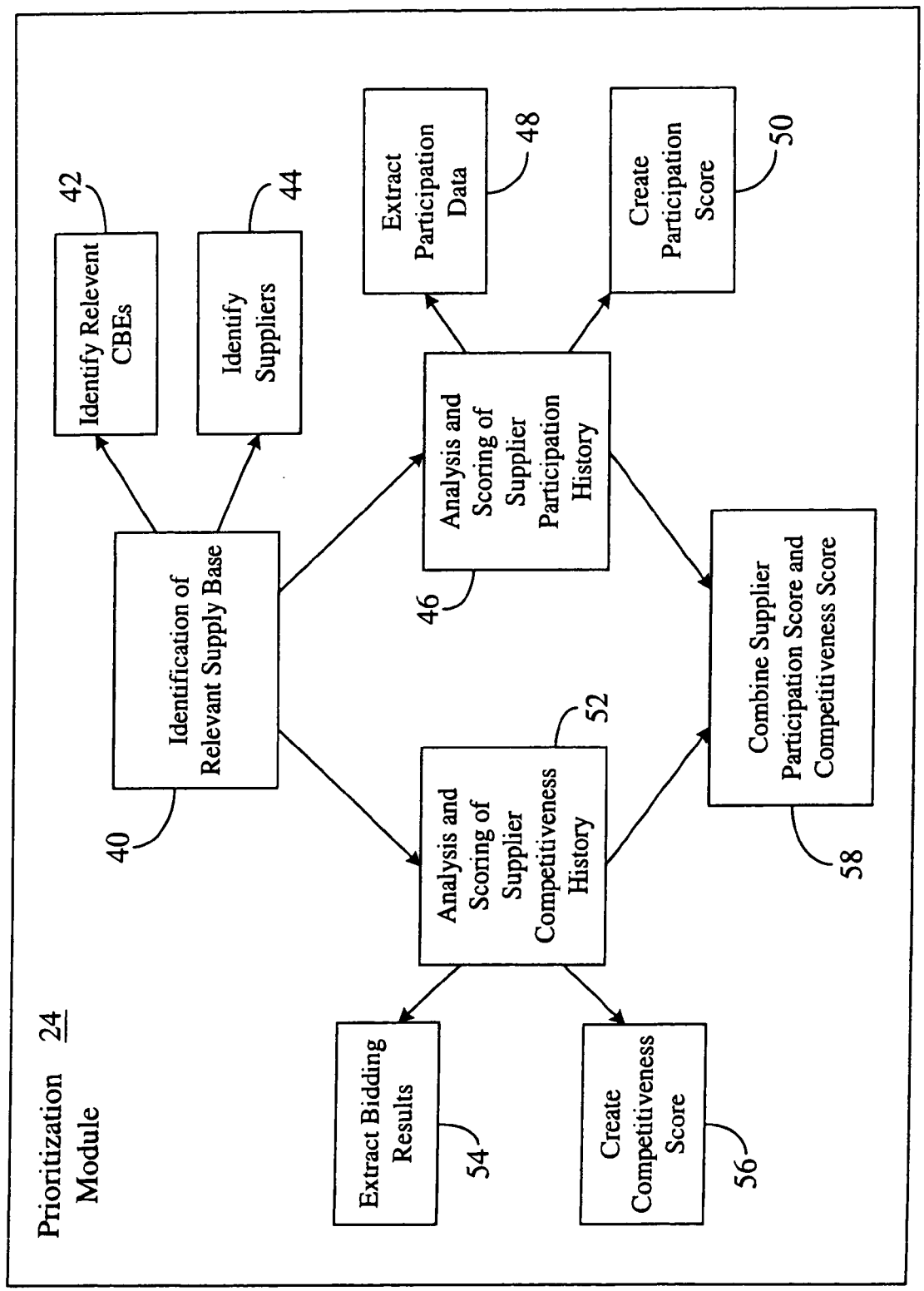
FIG. 4 shows various functions performed by the prioritization module according to one embodiment of the present invention.

Referring now to FIG. 4, which shows various functions performed by the prioritization module 24 according to one embodiment of the present invention. As noted hereinbefore, the PM 24 generally operates on three types of input data: (1) the profile data 32, (2) the contact event data 34, and (3) the bidding history data 36. The PM 24 module performs four discrete processes utilizing appropriate data from the input data. The four discrete processes include: (1) identification of relevant supply base 40, (2) analysis and scoring of supplier participation history 46, (3) analysis and scoring of supplier competitiveness history 52, and (4) combination of supplier participation score and competitiveness score 58. As shown in FIG. 4, some of these processes include sub-processes as discussed hereinbelow.

Figure 5:
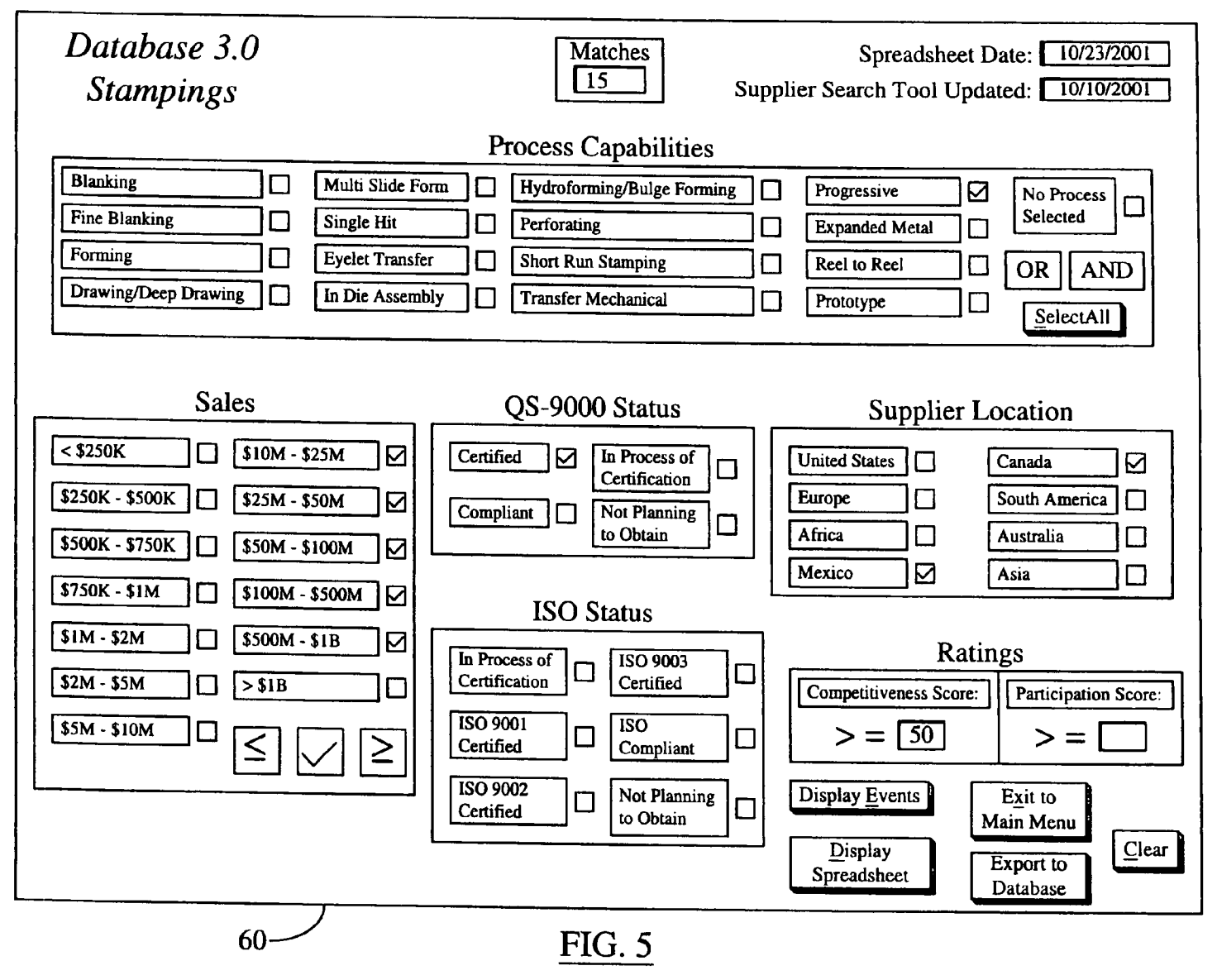

In the identification of relevant supply base 40 ("the identification process"), the PM 24 accesses the profile data 32 obtained during supplier registration process and generates a user interface 60 (FIG. 5), which is displayed on the display 29 for the host computer 20. FIG. 5 illustrates an exemplary user interface 60 generated and displayed by the prioritization module 24 according to one embodiment of the present invention. As shown in FIG. 5, the user interface 60 displays a number of data fields that an operator or user can select to identify the target supplier base—i.e., to generate the prioritized list of potential bidders. FIG. 5 illustrates the user interface 60 to identify the target supplier base for a metal stamping process to be auctioned by the auction sponsor 10. The user or operator (not shown) at the auction coordinator's site may select (or deselect) appropriate data fields (as per buyer's requirements) to narrow or enlarge the choices of potential suppliers. For example, the user may restrict the number of selections to fifteen (15) as shown in FIG. 5. Further, the user may select one or more sub-processes or related processes for metal stamping (e.g., progressive metal stamping selected in FIG. 5) to focus on those suppliers that are capable of providing specialized services requested by the buyer 10. The Boolean operators 'AND' and 'OR' and the 'Select All' option may be used to narrow or expand the search.

Additional fields in FIG. 5 are similar to those associated with the supplier profile data 32 discussed earlier with reference to FIG. 3. For example, the user may also select appropriate values in such fields as the 'sales levels' field, the 'quality certification (QS-9000 or ISO)' fields, and the 'supplier geographic location' field shown in FIG. 5. The 'Ratings' field is discussed hereinbelow with reference to FIGS. 6 and 7 and processes 46 and 52 in FIG. 4. The user may also select various display options for the results of the search performed by the PM 24. For example, the user may select to display the list of selected suppliers in a spreadsheet form (where the suppliers are ranked, for example, in a descending order), or the user may wish to clear the values selected in different fields and initiate a new search, or the user may select to export the results of the search to a designated database (e.g., a database in the storage 27 or in another computer connected to the host computer 20).

FIG. 4 illustrates two sub-processes for the identification process 40. In the "identify relevant CBEs" sub-process 42, the PM 24 may identify all CBEs that are relevant to the CBE at hand (here, the CBE for metal stampings). The information about each prior CBE carried out by the auction coordinator may be stored either part of the profile data 32 or independently of the profile data 32. The CBE data may be stored in a searchable database form in, for example, the storage 27. When the user selects the 'Display Events' option (from the user interface 60 in FIG. 5) to view a display of the list of relevant CBEs, the PM 24 searches the stored information about all CBEs conducted by the auction coordinator and identifies only those CBEs that auctioned at least one item similar to the item to be auctioned in the current CBE. Thus, in the example illustrated in FIG. 5, the PM 24 selects those CBEs that auctioned one or more items related to metal stampings. Such items may include, for example, hard tool stampings, synergy metal stampings, sheet metal stamping and forming, small and medium metal stamping, large metal stamping, etc. Thus, through the sub-process 42, the PM 24 may first generate a list of prior bidding events or auctions having auctioned one or more items similar to at least one item to be auctioned in the current auction requested by the buyer 10.

In the "identify suppliers" sub-process 44, the PM 24 searches the profile data 32 (using, for example, the search restrictions input by the user through the user interface 60) and extracts a list of all those suppliers who participated in the CBEs identified at block 42. For each supplier identified at block 44, the PM 24 may investigate whether the supplier has the desired competitiveness score or the desired participation score (as selected by the user through the user interface 60). Based on the inquiry of supplier's scores, the PM 24 may generate a final, prioritized list of potential bidders. The prioritized output may list the qualified bidders in the descending order, i.e., the bidder having the highest score is listed first (or, given highest priority) followed by bidders with lower scores. Of course, the number of bidders in the list may be restricted by the user by entering desired numerical limit in the 'Matches' field in the interface 60.

In one embodiment, after conclusion of each auction, the PM 24 may compute the participation score and/or the competitiveness score and/or the combined score for each bidder who participated in that auction just concluded. The PM 24 may store these computed scores along with the profile data for each bidder. Alternatively, the PM 24 may store the scores in a separate, searchable database in, for example, the storage 27. The database may include a list of all prior bidders and the relevant scores for each bidder against the bidder's name. The generation or computation of the participation score and the competitiveness score for a bidder is described hereinbelow with reference to FIGS. 6 and 7. It is noted that the user interface 60 allows a user to restrict or narrow the search of potential suppliers by specifying desired scores for the participation score field and the competitiveness score field displayed on the interface 60. In the embodiment illustrated in FIG. 5, the user has chosen to view the names of only those suppliers having the competitiveness score greater than or equal to fifty (50).

Figure 6:
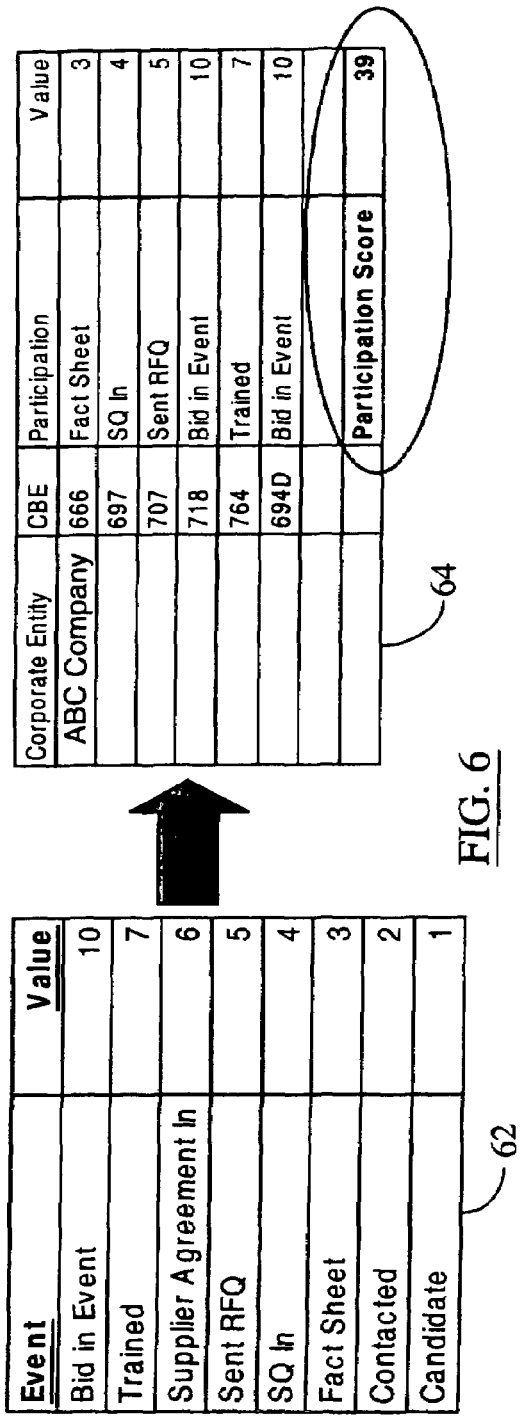
FIG. 6 illustrates an exemplary scoring scheme utilized by the prioritization module in one embodiment of the present invention to generate a participation score for a bidder.

As indicated in FIG. 4, the process 46 analyzes and scores supplier participation history using the contact event data 34. In one embodiment of the present invention, the scoring process 46 assigns an objective, numerical score for each level of auction participation. FIG. 6 illustrates an exemplary scoring scheme utilized by the prioritization module 24 in one embodiment of the present invention to generate a participation score for a bidder. As shown by the table 62 in FIG. 6, each contact event in an auction may be assigned a numerical score based on, for example, the importance of that contact event in the overall auction process and in successful conclusion of the auction. For example, the "contacted" event may receive a numerical score of "2," whereas the "bid-in" event may receive a score of "10." As can be understood by one skilled in the art, there may be many scoring schemes different from that shown in table 62 that may be successfully utilized to generate an objective participation score for a supplier.

The sub-process 48 examines the contact event data for each supplier in the auction coordinator's database to extract information about that supplier's bidding participation. For each CBE the supplier is associated with (or has participated in), the sub-process 48 identifies how far that supplier progressed in the bidding process. The participation score generation sub-process 50 then assigns the highest possible score to the supplier for each CBE the supplier is associated with. In assigning the score, the sub-process 50 may consult the pre-defined score chart shown in table 62. In the embodiment shown in FIG. 6, the table 64 shows the participation score computed for a supplier (ABC Company) from the supplier's auction participation history. The supplier receives a score for the supplier's level of participation in each CBE. For example, if the supplier is only contacted for a particular event and then drops out of the auction process, then the supplier will receive only two points (as shown in table 62). As shown in table 64, the supplier (ABC Company) receives a score of five (5) points for CBE #707 because the supplier dropped out of the auction process for CBE #707 after receiving an RFQ. On the other hand, the supplier in FIG. 6 is shown to have received a score of ten (10) points for CBE #718 and CBE #694D because the supplier placed bids in those CBEs. The score generation sub-process 50 then aggregates individual participation scores to generate the final participation score for the supplier (ABC Company) as illustrated in table 64.

Figure 7:
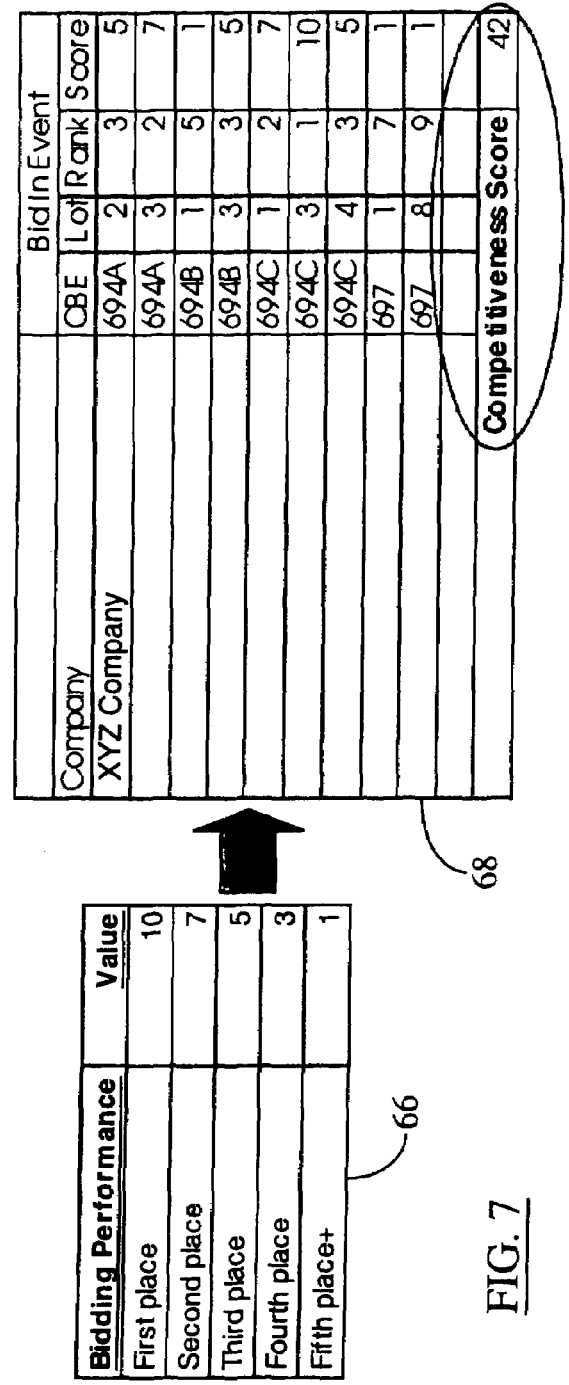
FIG. 7 illustrates an exemplary scoring scheme utilized by the prioritization module in one embodiment of the present invention to generate a competitiveness score for a bidder.

As shown in FIG. 4, the process 52 analyzes and scores supplier competitiveness history using the bidding history data 36 (FIG. 3). In one embodiment of the present invention, the scoring process 52 assigns an objective, numerical score for a bidder's rank in an auction. FIG. 7 illustrates an exemplary scoring scheme utilized by the prioritization module 24 in one embodiment of the present invention to generate a competitiveness score for a bidder. The scoring scheme shown in table 66 in FIG. 7 is similar to that shown in table 62 in FIG. 6. As shown in table 66 in FIG. 7, each level of bidding performance may be assigned a numerical score based on, for example, the rank achieved by a bidder in a particular auction. The score assignments in table 66 are in a descending order—i.e., a bidder achieving the first rank gets the maximum points (here, ten points), followed by the bidder having the second rank, and so on as shown in FIG. 7. As can be understood by one skilled in the art, there may be many scoring schemes different from that shown in table 66 that may be successfully utilized to generate an objective competitiveness score for a supplier.

The sub-process 54 examines the bidding history data for each supplier in the auction coordinator's database to extract information about that supplier's bidding performance. The sub-process 54 identifies which CBE the supplier is associated with and which lot(s) in that CBE the supplier has bid on. The competitiveness score generation sub-process 56 then assigns the score to the supplier in view of the supplier's rank in the bidding for the corresponding lot. In assigning the score, the sub-process 56 may consult the pre-defined score chart shown in table 66. In the embodiment shown in FIG. 7, the table 68 shows the competitiveness score computed for a supplier (XYZ Company) from the supplier's bidding history. The supplier receives a score for the supplier's rank in each lot the supplier has placed a bid for in the corresponding CBE. For example, as shown in table 68, the supplier (XYZ Company) receives a score of five (5) points for lot #2 in CBE #694A because of the supplier's third rank, but receives a score of seven (7) points for lot #3 in the same CBE #694A because of the supplier's second rank for that lot. The sub-process 56 then aggregates individual scores to generate the final competitiveness score for the supplier (XYZ Company) as illustrated in table 68.

It is noted that the prioritization module 24 may be designed to compute either the prioritization score or the competitiveness score, but not both. Alternatively, the PM 24 may compute both of these scores for each potential supplier. In that event, the PM 24 may also be designed to compute the combined score as discussed hereinbelow. It is evident that the score computation process may be ongoing in the sense that the PM 24 may need to update the prioritization and the competitiveness scores for each supplier or for each group of suppliers every time a new auction takes place because of the auction-related changes in the supplier participation data and bidding history information. In this manner, the PM 24 can maintain the most-recent participation and competitiveness scores for potential suppliers.

Figure 8:
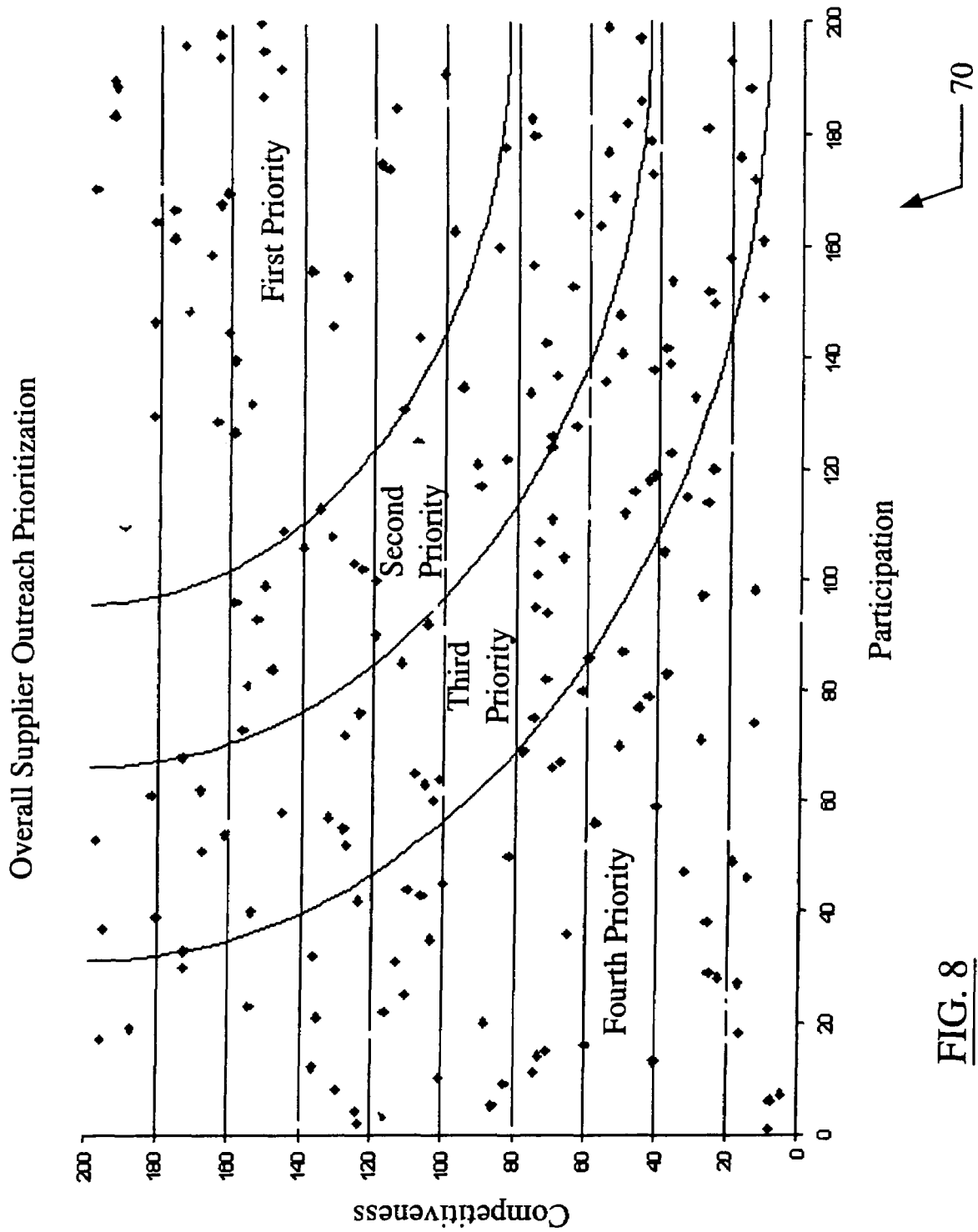
FIG. 8 illustrates an exemplary scatter diagram depicting an X-Y plot of prioritization and competitiveness scores for a number of suppliers.

The participation and competitiveness scores for each supplier may be displayed on, for example, the display monitor 29 (FIG. 3) in many different forms including, for example, in a histogram form, in a spreadsheet form for each category of scores (participation score category and competitiveness score category) with suppliers listed in, for example, a descending order for each category of scores, or in a graph or chart form. FIG. 8 illustrates an exemplary scatter diagram 70 depicting an X-Y plot of prioritization and competitiveness scores for a number of suppliers. As shown in FIG. 8, the scatter diagram 70 may assist an auction coordinator to assign (either manually or automatically using the PM 24) different priority levels to the suppliers whose data are plotted on the graph 70. FIG. 8 illustrates various priority levels created through rings drawn on the scatter diagram 70. For example, the auction coordinator may assign the first quartile rank (i.e., the highest priority level) to those suppliers who have higher values for both their participation and competitiveness scores, the second quartile rank to suppliers immediately below (in participation and competitiveness score values) those in the first quartile, and so on. The auction coordinator 20 may then initiate contacting those suppliers in the first quartile and inviting them to participate in the current auction commenced by the sponsor 10. Many other schemes to conveniently display the supplier scores and assign supplier priorities may be conveniently devised.

Referring again to FIG. 4, in one embodiment, the PM 24 may also include a process 58 that combines the most recent participation score and the most recent competitiveness score for each supplier and generates a combined score for that supplier. The combined score may be stored along with the corresponding participation and competitiveness scores. In one embodiment, the combined score is calculated using the following formula:

$$\text{Combined Score} = \sqrt{(\text{Participation Score})^2 + (\text{Competitiveness Score})^2}$$

In one embodiment, the PM 24 may be configured to determine supplier priorities based on the combined score values for the suppliers. For example, the PM 24 may prioritize the supplier pool starting with the supplier having the highest combined score and then choosing each next supplier in a descending order. Alternatively, the PM 24 may display a histogram with supplier names on the X-axis and the combined score values on the Y-axis. Other alternative displays similar to those discussed hereinabove with reference to the priority and competitiveness scores may also be generated for the convenience of the user making the decision as to supplier prioritization.

The foregoing describes a method and system for selecting potential bidders or suppliers for a current electronic auction by using quantitative models to create a prioritized list of potential suppliers. A prioritization software analyzes a supplier's bidding participation history and bidding competitiveness history from the bidding data collected for all prior auctions in which the supplier participated or was requested by the auction coordinator to participate. Using the prior bid data, the software generates a participation score and a competitiveness score for the supplier. The participation and competitiveness scores may be combined to generate a combined score. All potential suppliers may be prioritized based on any of these scores individually or a combination of two or more of these scores. The prioritized list may contain the names of suppliers in a descending order so that the auction coordinator may select which of the listed suppliers be requested to participate in the current auction.

The supplier prioritization software according to the present invention dramatically reduces the number of suppliers required at the beginning of a competitive bidding event or auction. Thus, the prioritization software assists in reducing the transaction cost involved in supplier selection by generating, using objective data, a prioritized list of potential suppliers that may be invited to participate in the auction. The prioritization list generated using quantitative values (instead of subjective values) further minimizes the amount of unnecessary calls to potential suppliers and maximizes the likelihood that a called supplier will place a competitive bid, thereby increasing the bidding yield per supplier selected.

While the invention has been described in detail and with reference to specific embodiments thereof, it will be apparent to one skilled in the art that various changes and modifications can be made therein without departing from the spirit and scope thereof. In particular, it should be noted that while the auction functions described above have been described in the context of downward pricing auctions, the auction functions can be equally applied to upward pricing auctions. Thus, it is intended that the present invention cover the modifications and variations of this invention provided they come within the scope of the appended claims and their equivalents.

What is claimed is:

1. A system for selecting a group of bidders for a current bidding event to auction a lot having one or more items, comprising:
    a processor configured to:
        identify a prior bidding event having occurred before said current bidding event, wherein said prior bidding event includes a plurality of contact events for each bidder participating in said prior bidding event;
        identify one or more participating bidders for said prior bidding event;
        quantify participation of each identified bidder in each of said plurality of contact events for said prior bidding event, thereby generating a corresponding participation score for each said identified bidder;
        prioritize the identified bidders in a first descending order based on said corresponding participation score, thereby generating a first prioritized list of bidders;
        select said group of bidders for said current bidding event from said first prioritized list of bidders;
        identify each bid-in event for said prior bidding event, wherein each said bid-in event is one of said plurality of contact events and relates to bids received from one or more identified bidders during said prior bidding event;
        obtain a corresponding rank for each said identified bidder for each said bid-in event in which said identified bidder has participated;
        quantify each corresponding rank for each said identified bidder for each said bid-in event in which said identified bidder has participated, thereby generating a corresponding competitiveness score for each said identified bidder;
        prioritize the identified bidders in a second descending order based on said corresponding competitiveness score, thereby generating a second prioritized list of bidders; and
        select said group of bidders for said current bidding event from at least one of said first prioritized list of bidders and said second prioritized list of bidders; and
    a memory coupled to the processor and configured to provide the processor with instructions.

2. The system of claim 1, wherein selecting said group of bidders from at least one of said first and said second prioritized lists of bidders includes one of the following: selecting a predetermined number of top bidders from at least one of said first and said second prioritized lists of bidders as said group of bidders for said current bidding event; and selecting a user-specified number of top bidders from at least one of said first and said second prioritized lists of bidders as said group of bidders for said current bidding event.

3. The system of claim 1, wherein identifying each said bid-in event includes identifying each said bid-in event for each lot that was placed on auction during said prior bidding event, wherein obtaining said corresponding rank includes obtaining said corresponding rank for each said identified bidder for each said bid-in event for each said lot identified for said prior bidding event, and wherein quantifying each said corresponding rank includes quantifying each said corresponding rank for each said identified bidder for each said bid-in event for each said lot identified for said prior bidding event.

4. The system of claim 1 wherein the processor is further configured to:
- generate a corresponding combined score for each said identified bidder using said corresponding participation score and competitiveness score;
- prioritize the identified bidders in a third descending order based on said corresponding combined score, thereby generating a third prioritized list of bidders; and
- select said group of bidders for said current bidding event from said third prioritized list of bidders.

5. The system of claim 4, wherein each said combined score is generated using the following formula:

$$\text{combined score} = \sqrt{(participationscore)^2 + (competitivenessscore)^2}.$$

6. A system for selecting a group of bidders for a current bidding event to auction a lot having one or more items, comprising:
- a processor configured to:
  - search a first database containing an information about one or more bidding events having occurred before said current bidding event to identify a prior bidding event therefrom, wherein said prior bidding event includes a plurality of contact events for each bidder participating in said prior bidding event;
  - search a second database using said information about said identified prior bidding event to identify one or more participating bidders for said prior bidding event, wherein said second electronic database contains identity information for all bidders corresponding to said one or more bidding events from said first database;
  - quantify participation of each identified bidder in each of said plurality of contact events for said prior bidding event, thereby generating a corresponding participation score for each said identified bidder;
  - prioritize the identified bidders in a first descending order based on said corresponding participation score, thereby generating a first prioritized list of bidders;
  - select said group of bidders for said current bidding event from said first prioritized list of bidders;
  - identify each bid-in event for said prior bidding event, wherein each said bid-in event is one of said plurality of contact events and relates to bids received from one or more identified bidders during said prior bidding event;
  - obtain a corresponding rank for each said identified bidder for each said bid-in event in which said identified bidder has participated;
  - quantify each corresponding rank for each said identified bidder for each said bid-in event in which said identified bidder has participated, thereby generating a corresponding competitiveness score for each said identified bidder;
  - prioritize the identified bidders in a second descending order based on said corresponding competitiveness score, thereby generating a second prioritized list of bidders; and
  - select said group of bidders for said current bidding event from at least one of said first prioritized list of bidders and said second prioritized list of bidders.

7. The system of claim 6, wherein the processor is further configured to:
- generate a corresponding combined score for each said identified bidder using said corresponding participation score and competitiveness score;
- prioritize the identified bidders in a third descending order based on said corresponding combined score, thereby generating a third prioritized list of bidders; and
- select said group of bidders for said current bidding event from said third prioritized list of bidders.

8. The system of claim 6, wherein the processor is further configured to cause the display of at least one of the following:
- at least one list of bidders from said first prioritized list of bidders, and said second prioritized list of bidders;
- said group of bidders selected from at least one of said first prioritized list of bidders, and said second prioritized list of bidders; and
- at least one of said corresponding participation score, and said corresponding competitiveness score for each said identified bidder.

9. A system for selecting a group of bidders for a current bidding event to auction a lot having one or more items, comprising:
- a processor configured to:
  - identify a prior bidding event having occurred before said current bidding event, wherein said prior bidding event includes a plurality of contact events for each bidder participating in said prior bidding event;
  - identify one or more participating bidders for said prior bidding event;
  - identify each bid-in event for said prior bidding event, wherein each said bid-in event is one of said plurality of contact events and relates to bids received from one or more identified bidders during said prior bidding event;
  - obtain a corresponding rank for each said identified bidder for each said bid-in event in which said identified bidder has participated;
  - quantify each corresponding rank for each said identified bidder for each said bid-in event in which said identified bidder has participated, thereby generating a corresponding competitiveness score for each said identified bidder;
  - prioritize the identified bidders in a descending order based on said corresponding competitiveness score, thereby generating a prioritized list of bidders; and
  - select said group of bidders for said current bidding event from said prioritized list of bidders.

10. The system of claim 9, wherein identifying said prior bidding event includes searching a first database containing an information about one or more bidding events having occurred before said current bidding event, and wherein identifying said one or more participating bidders includes searching a second database using said information about said identified prior bidding event, wherein said second database contains identity information for ail bidders corresponding to said one or more bidding events from said first electronic database.

11. The system of claim 9, wherein selecting said group of bidders from said prioritized list of bidders includes one of the following:
- selecting a predetermined number of top bidders from said prioritized list of bidders as said group of bidders for said current bidding event; and
- selecting a user-specified number of top bidders from said prioritized list of bidders as said group of bidders for said current bidding event.

12. The system of claim 9, wherein identifying each said bid-in event includes identifying each said bid-in event for each lot that was placed on auction during said prior bidding event, wherein obtaining said corresponding rank includes obtaining said corresponding rank for each said identified bidder for each said bid-in event for each said lot identified for said prior bidding event, and wherein quantifying each said corresponding rank includes quantifying each said corresponding rank for each said identified bidder for each said bid-in event for each said lot identified for said prior bidding event.

13. The system of claim 9, wherein the processor is further configured to:
   allow a user to specify a set of one or more criteria;
   search a database using said set of criteria to select said group of bidders for said current bidding event, wherein said database includes information about a plurality of bidders arranged according to said set of criteria, and wherein said plurality of bidders includes said group of bidders for said current bidding event; and
   present to said user at least the name of each bidder in said group of bidders for said current bidding event obtained by searching said database.

14. The system of claim 13, wherein said information about said plurality of bidders includes at least one of the following:
   the name of each of said plurality of bidders;
   a first information about process capabilities of each of said plurality of bidders;
   a second information about sales revenue of each of said plurality of bidders;
   a third information about quality certification status of each of said plurality of bidders;
   a fourth information about geographic location of each of said plurality of bidders; and
   said corresponding competitiveness score for each of said plurality of bidders.

15. The system of claim 9, wherein the processor is further configured to cause the display of at least one of the following:
   said prioritized list of bidders;
   said group of bidders selected from said prioritized list of bidders; and
   said corresponding competitiveness score for each said identified bidder.

* * * * *

UNITED STATES PATENT AND TRADEMARK OFFICE
CERTIFICATE OF CORRECTION

PATENT NO. : 7,657,461 B2  Page 1 of 1
APPLICATION NO. : 12/150896
DATED : February 2, 2010
INVENTOR(S) : Erik P. Young It is certified that error appears in the above-identified patent and that said Letters Patent is hereby corrected as shown below:

Claim 10
Column 18, line 56, delete "ail bidders" and insert -- all bidders --

Signed and Sealed this

Twenty-seventh Day of April, 2010

David J. Kappos
*Director of the United States Patent and Trademark Office*